US007365044B2

(12) United States Patent
Farag

(10) Patent No.: US 7,365,044 B2
(45) Date of Patent: Apr. 29, 2008

(54) CHEMICAL FOR DATA DESTRUCTION

(75) Inventor: Ihab H. Farag, Durham, NH (US)

(73) Assignee: University of New Hampshire, Durham, NH (US)

( * ) Notice: Subject to any disclaimer, the term of this patent is extended or adjusted under 35 U.S.C. 154(b) by 381 days.

(21) Appl. No.: 11/084,686

(22) Filed: Mar. 18, 2005

(65) Prior Publication Data

US 2005/0257049 A1  Nov. 17, 2005

Related U.S. Application Data

(63) Continuation of application No. 10/803,552, filed on Mar. 18, 2004, now Pat. No. 7,099,110.

(60) Provisional application No. 60/554,285, filed on Mar. 18, 2004.

(51) Int. Cl.
*C11D 7/50* (2006.01)

(52) U.S. Cl. ...................................... 510/175; 134/1.3

(58) Field of Classification Search .................... None
See application file for complete search history.

(56) References Cited

U.S. PATENT DOCUMENTS

| 4,654,406 | A | * | 3/1987 | Malhotra .................... 526/91 |
| 4,725,375 | A | | 2/1988 | Fujii et al. |
| 7,112,795 | B2 | * | 9/2006 | Lee et al. .............. 250/339.07 |
| 2004/0252628 | A1 | | 12/2004 | Detzler | |

FOREIGN PATENT DOCUMENTS

JP           51131426 A   *  11/1976

* cited by examiner

*Primary Examiner*—Gregory Webb
(74) *Attorney, Agent, or Firm*—Dickstein Shapiro LLP

(57) ABSTRACT

A compound and method for rendering a hard disk drive forensically unrecoverable includes a solution comprising cerium ammonium nitrate, hydrochloric acid by mass, and water. When applied to the surface of a platter, the compound sufficiently disrupts or corrupts the platter such that not recovering the information previously stored on the platter is not possible using known data recovery techniques.

7 Claims, 2 Drawing Sheets

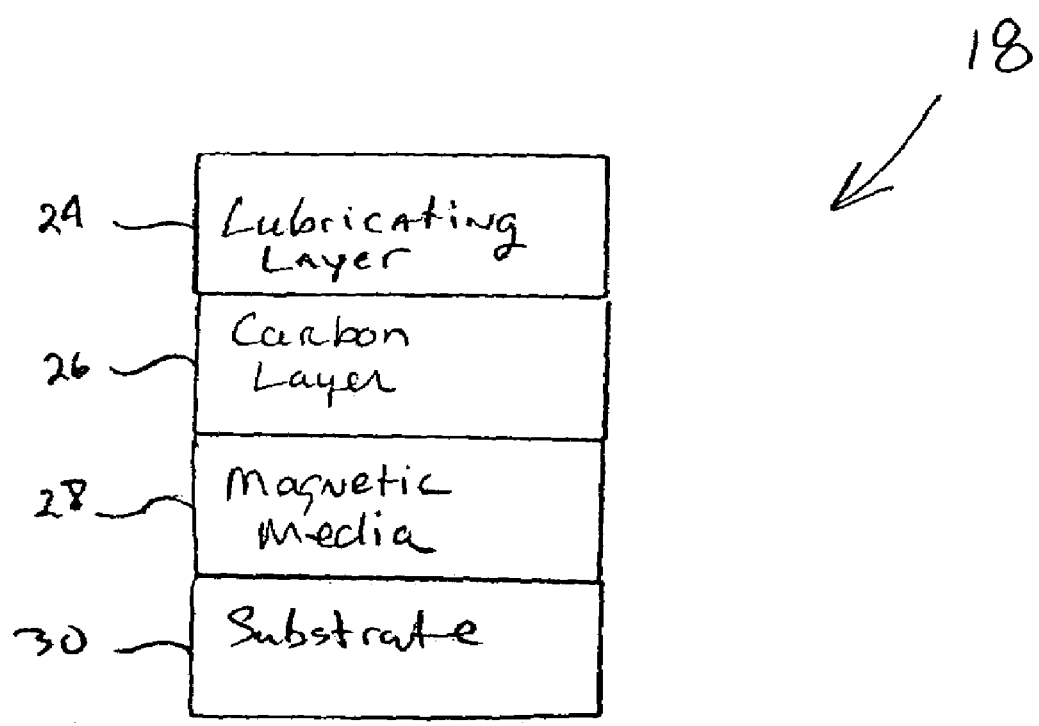

CHEMICAL FOR DATA DESTRUCTION

CROSS-REFERENCE TO RELATED APPLICATIONS

This application is a continuation in part of U.S. patent application Ser. No. 10/803,552, filed Mar. 18, 2004, now U.S. Pat. No. 7,099,110 and claims the benefit of U.S. Provisional Application No. 60/554,285, filed Mar. 18, 2004, both of which are fully incorporated herein by reference.

TECHNICAL FIELD

The present invention relates to chemicals and more particularly, to chemicals for permanently destroying magnetic data storage media and other data storage media, and their contained data.

BACKGROUND INFORMATION

The 21st century has presented us with a new and different environment in which we must all work and live. Privacy and security are paramount concerns for individuals, corporations and governments alike. Unfortunately, our increased desire for security is being currently being satisfied at the expense of privacy. Some of the most Draconian changes in law and public policy ever considered threaten to change the face our free and democratic society. Local police and federal authorities have had the definition of 'probable cause' extended to such a degree that obtaining a search warrant will soon be as easy and quick as using an ATM. Airports will soon have the right to check your background history when you purchase a ticket. Corporations and governments, besieged by hackers and espionage agents are also looking for solutions, including workplace policies of reading employee email (including personnel addresses), drug testing, personality profiling, in-office searches, video cameras, etc.

The Federal government has recently enacted Carnivore (recently given a less frightening name due to negative public reaction), which is capable of analyzing tens of millions of email messages every day; the equivalent of a wire tap for messaging but using a shotgun approach. Our free society is struggling with the conflict between security and individual privacy, and privacy is losing. However, just as technology can be used to decrease privacy it can be used to regain it, which is the objective of several current available products as well as the device detailed hereinbelow.

Recent trends in criminal prosecution involving digital evidence and the desire for consumers to better protect their privacy and personnel data, have given rise to a number of new technology products. Thus far, these products have been grouped into two classes, disk sanitizers and encryption systems.

Disk-sanitizers, among other actions, permanently delete "deleted" files. This bizarre nomenclature is the result of two facets of hard disk use. The first facet results from the desire, on the part of consumers, to have file systems that were "idiot-proof". To meet this requirement, operating systems were modified so that the act of "deleting" a file merely moves the file to a "trash can". If the user realizes they have made a mistake they can access the trashcan to restore the file. Thus the original file was never really deleted in the first place.

The second facet resulting in the bizarre nomenclature is that even "deleted" files are easily recovered unless the space they occupied is overwritten by some other data. This is what sanitizers do; they make sure that trashcan copies are prevented, and that the space used by the file is overwritten by junk data. Even after a sanitizer is used, however, recovering files is still possible using sophisticated tools that read the areas between distinct storage areas, and can reconstruct files using these "shadow writes". In fact, there currently exists and entire industry subsection devotes to the recovery of data, commonly referred to as "forensic data recovery".

Therefore, there is a need for chemicals that can permanently destroy data from magnetic data storage media and other data storage media such that the data is not forensically recoverable. The present invention is directed toward this need.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

An object of the invention is to provide a novel composition which, when applied to a hard disk drive in a sufficient quantity, will quickly and cost effectively render the information stored on the hard disk drive forensically unrecoverable. The compound should preferably be capable of penetrating the various layers of a hard disk drive such that the information stored in the magnetic media is corrupted or otherwise disrupted.

It has been found that the above and other objectives are attainable by compounding cerium ammonium nitrate (CAN) with at least one acid, preferably hydrochloric acid (HCl). The CAN and HCl are preferably contained in a solution containing a solvent such as water.

The compound includes approximately 2%-approximately 20% cerium ammonium nitrate by mass, approximately 1.8%-approximately 10% hydrochloric acid by mass, and water. In the preferred embodiment, the compound includes approximately 10% cerium ammonium nitrate by mass, approximately 3.6% hydrochloric acid by mass, and water. A surfactant may optionally be added.

According to another embodiment, the present invention includes a method of rendering a magnetic data storage device forensically unrecoverable. The method includes the act of applying a sufficient quantity of a compound including cerium ammonium nitrate and an acid to the surface of said magnetic data storage device.

BRIEF DESCRIPTION OF THE DRAWINGS

These and other features and advantages of the present invention will be better understood by reading the following detailed description, taken together with the drawings wherein:

FIG. 2 is a cross sectional view of one embodiment of the platter shown in FIG. 1.

DETAILED DESCRIPTION OF THE PREFERRED EMBODIMENTS

Figure 1:
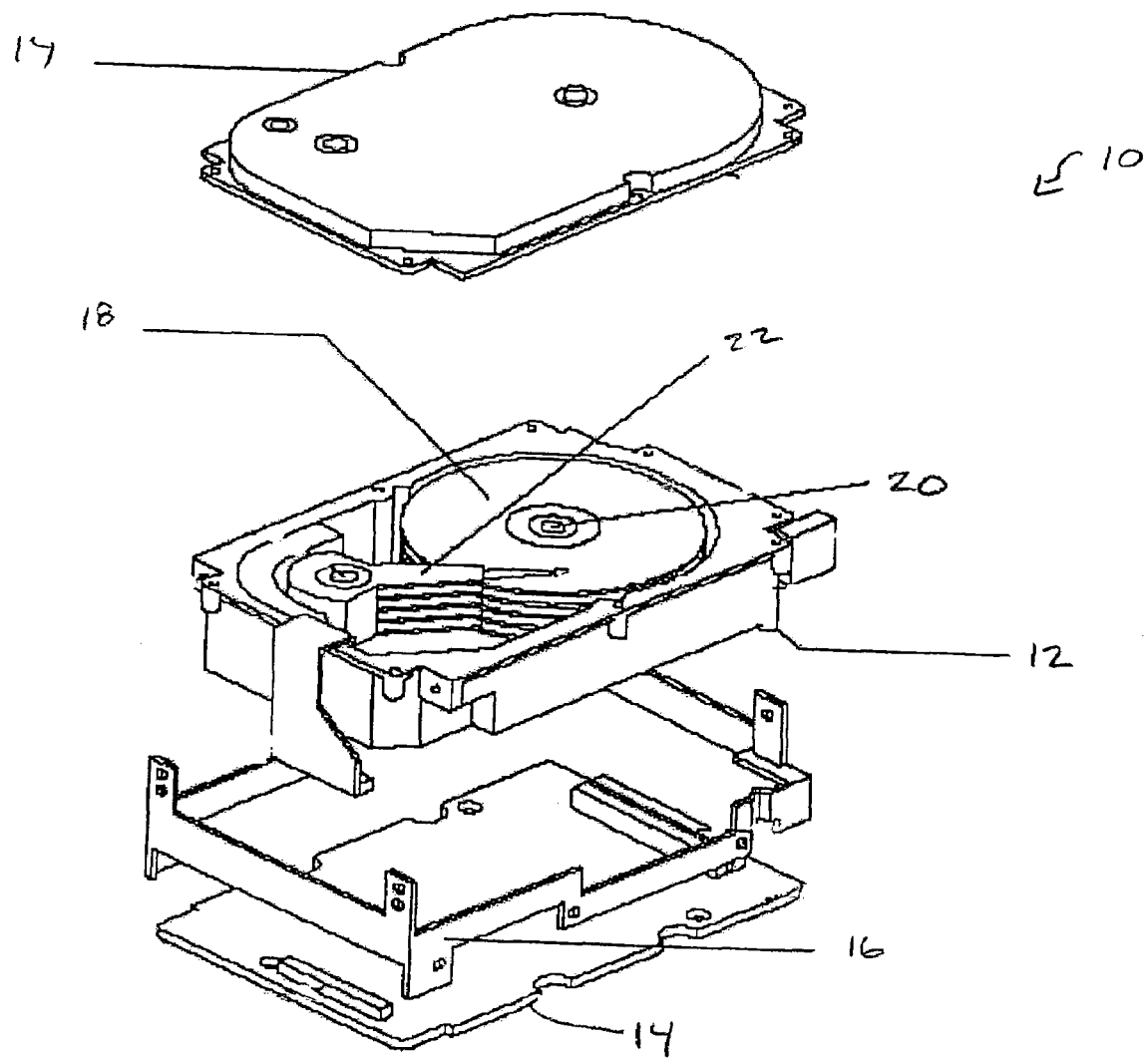
FIG. 1 is an exploded view of one embodiment of a typical hard disk drive.

The present invention features a compound that is applied to a magnetic data storage device, such as a hard disk drive, tape drive, or the like, containing data. Once applied to the hard disk drive, the compound renders the data stored therein forensically unrecoverable, and thus permanently deleted. It is important to note that the present invention is applicable to both internal as well as external hard disk drives.

A hard disk drive 10, FIG. 1, typically includes a housing 12 including a frame 16 and a top and a bottom cover 14. Disposed within the housing 12 are one or more platters 18, typically multiple platters 18, rotatably disposed about a spindle 20. One or more actuator arms 22, each having a slider and head, are disposed proximate each surface of the platters 18 used to store information.

A cross-sectional view of a typical platter 18 is shown in FIG. 2. The platter 18 typically includes a layer of magnetic media 28 generally applied by vapor deposition (sputtering) to a substrate 30, a protective layer of carbon 26 disposed proximate the magnetic media 28, and a lubricating layer 24 disposed about an outer surface of the platter 18.

A motor (not shown) rotates the spindle 20, FIG. 1, and thus the platters 18. The magnetic media 28, FIG. 2, contains tiny domains of magnetization that are arranged concentrically about the platter 18. The tiny domains of magnetization are orientated to store information that is transferred through the read/write heads as is well known to those skilled in the art.

The compound, according to one embodiment of the present invention, when applied in a sufficient quantity to the surface of the platter 18 renders the information contained in the platters 18 forensically unrecoverable by altering the surface of the magnetic media 28. As a result, the tiny domains of magnetization of the magnetic media 28 are altered, and the information contained therein is permanently destroyed.

The term "forensically unrecoverable", as used herein, is intended to mean that the information contained on the hard disk drive is sufficiently disrupted or corrupted that not possible to recover the data using known data recovery techniques. It is also important to note that all of the information contained on the hard disk drive does not necessarily have to be disrupted, but rather that simply enough of the information must be disrupted or corrupted such that information is rendered useless once the compound has been applied.

The term "sufficient quantity", as used herein, is defined as at least the minimum amount of the compound which, when applied to the surface of the platter 18, is required to prevent the data from being forensically recovered within a specified time period. Because of the wide variety of sizes, arrangements, numbers of, design of platters 18, and the like, the "sufficient quantity" of the compound will depend on each circumstance and application. Those skilled in the art will readily be able to determine the sufficient quantity necessary for a specific application without undue experimentation in view of the present application.

A desired characteristic of the compound according to one embodiment of the present invention is that that it should be corrosive enough to cause the destruction of one or more of the layers 24-30 of the platters 18. Additionally, the compound should preferably cause a minimal amount of collateral damage. In the preferred embodiment, the destructive nature of the compound preferably decreases quickly after activation such that the likelihood of damage to the surrounding is minimized while still preventing the information from being forensically recoverable.

In the preferred embodiment, the compound renders the information contained within the hard disk drive forensically unrecoverable within approximately 15 minutes. Of course, other time periods are also possible, but the 15-minute or less time period is believed to be beneficial in the event that the information contained on the hard disk drive must be rendered forensically unrecoverable very quickly, for example, in the event the hard disk drive is stolen or being hacked.

According to the preferred embodiment, the compound according is to the present invention features a mixture including at least cerium ammonium nitrate (CAN) and an acid, preferably hydrochloric acid (HCl). Both CAN and HCl are relatively inexpensive, and generally available, and are minimally toxic.

The compound preferably includes a solution including between approximately 2%-approximately 20% CAN by mass with approximately 1.8%-approximately 10% HCl by mass. In the preferred embodiment, the compound includes approximately 10% CAN+approximately 3.6% HCl with the remaining percent being a solution, preferably water or the like.

Tests were performed using solution containing approximately 10% CAN+approximately 3.6% HCl applied to the surface of a Seagate™ hard disk drive as a function of time. After approximately 3 minutes, the surface of the hard disk drive includes an effected region of approximately 247 nm, after approximately 6 minutes, the surface of the hard disk drive includes an effected region of approximately 314 nm, approximately 10 minutes, the surface of the hard disk drive includes an effected region of approximately 390 nm, and approximately 15 minutes, the surface of the hard disk drive includes an effected region of approximately 577 nm.

Tests were also performed using the present invention on a Maxtor™ 60 GB hard disk drive. The disk drive was sprayed directly with a solution containing approximately 10% CAN+approximately 3.6% HCl after 72 hours. The hard disk drive suffered extensive damage and corrosion of the media platters with several of the areas peeling. Forensic data was attempted on this hard disk drive with the results being that the information was unrecoverable.

The effect of HCl concentration on etching were also tested. It has been found that approximately 3.6%-approximately 7.2% HCl works better than approximately 1.8%, and that varying the concentration of HCl between approximately 3.6% and approximately 7.2% showed almost no variation within a two-hour time period.

According to the preferred embodiment, the CAN and HCl are stored separately and are mixed just prior to application on the platters. Alternatively, the compound of CAN+HCl may be mixed and stored prior to application on the platters. However, tests indicate that the effectiveness of the etching may decrease over time after the CAN and HCl have been mixed.

The compound may optionally include a surfactant. The presence of a surfactant may aid in dispersing the compound across the surface of the platters, preventing puddling and pooling, and thereby aiding in forming a film or layer of the compound across the surface of the platter. However, tests have been successfully performed without the need of a surfactant. The present invention may include any surfactant such as, but not limited to, alkylaryl polyether alcohol (commonly referred to as Triton x-100), dextran, sugar, acrylamide solution, and polyvinyl alcohol. Those skilled in the art will readily understand that other surfactants are also possible and are intended to be included in the present invention unless otherwise limited.

According to another embodiment, the present invention may include a compound comprising CAN and other acids other than HCl. For example, the acid may include sulfuric, nitric acid, as well as other types of acids.

Those skilled in the art will recognize that the present invention may include various concentrations of CAN, and HCl, as well as various other acids. Additionally, other chemicals may be added (such as, but not limited to, surfactants and the like) without departing from the scope of the present invention.

From the above description, it is clear that the objectives described hereinabove, as well as other objects, are attainable by compounding cerium ammonium nitrate and at least one acid, preferably hydrochloric acid. This compound is corrosive enough to quickly cause the destruction of one or more of the layers of the platters such that the information contain on the platters is forensically unrecoverable.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A method of rendering a magnetic data storage device forensically unrecoverable comprising the act of applying a sufficient quantity of a composition comprising cerium ammonium nitrate and an acid to the surface of said magnetic data storage device.

2. The method as claimed in claim 1 wherein said acid comprises hydrochloric acid.

3. The method as claimed in claim 2 wherein said composition comprises approximately 2%-approximately 20% cerium ammonium nitrate by mass, approximately 1.8%-approximately 10% hydrochloric acid by mass, and water.

4. The method as claimed in claim 1 wherein said composition further comprises a surfactant.

5. The method as claimed in claim 1 wherein said composition further comprises a solvent.

6. The method as claimed in claim 1 wherein said composition further comprises water.

7. The method as claimed in claim 1 wherein said composition comprises approximately 10% cerium ammonium nitrate by mass, approximately 3.6% hydrochloric acid by mass, and water.

* * * * *